Oct. 6, 1964 S. A. TOMPKINS ETAL 3,152,034
REINFORCED THERMAL INSULATION HAVING FACING
SHEETS SECURED TO THE REINFORCEMENT
Filed Feb. 29, 1960
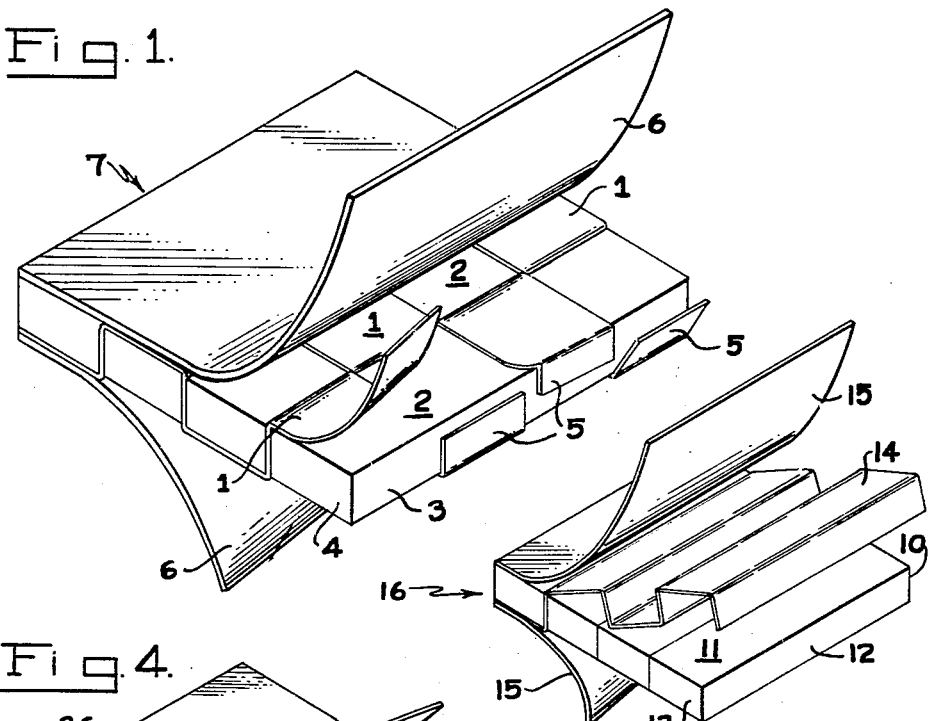
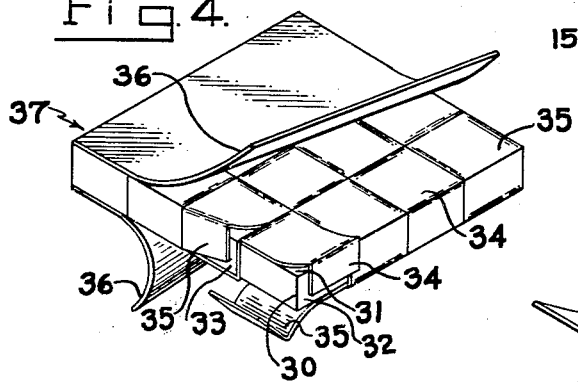
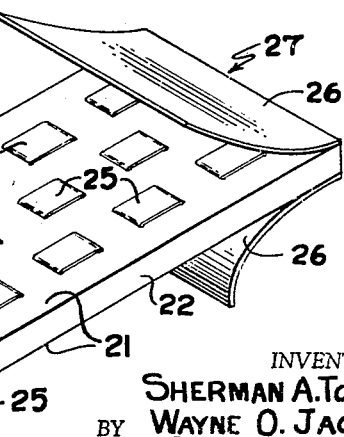
INVENTOR.
SHERMAN A. TOMPKINS
BY WAYNE O. JACKSON
ATTORNEY 3,152,034
REINFORCED THERMAL INSULATION HAV-
ING FACING SHEETS SECURED TO THE
REINFORCEMENT
Sherman A. Tompkins, New York, N.Y., and Wayne O.
Jackson, Somerville, N.J., assignors to Johns-Manville
Corporation, New York, N.Y., a corporation of New
York
Filed Feb. 29, 1960, Ser. No. 11,858
5 Claims. (Cl. 161—113)

The instant invention relates to a thermal insulation and is particularly directed to methods for forming a reinforced thermal insulation and the products formed by such methods.

In many instances, because of extremely high temperature conditions, it is desirous and necessary that a thermal insulation heat barrier be used to provide the required protection against these extremely high temperature conditions. However, thermal insulation and heat barriers are conventionally made from materials which are generally structurally weak and are difficult to incorporate in the necessary surroundings because of the prevailing mechanical and structural limitations involved. Also, because of the low strength characteristics of the thermal insulating materials, surface coating and sealing materials do not develop a strong bond with the thermal insulating material and usually, these surface or coating materials, generally in thicknesses of approximately 0.006 to 0.125 in. delaminate or peel away from the thermal insulating material. This is especially true where the reinforced or clad thermal insulating material is attached or secured between relatively thin surface materials such as sheets of resin impregnated asbestos papers or the like materials in thicknesses less than approximately 0.125 in. and more specifically in the neighborhood of 0.010 in., and then metallic sheets in thicknesses less than 0.0625 in. and more specifically in the neighborhood of 0.006 in.

It is an object of this invention to provide a method for reinforcing structurally weak thermal insulating materials with a desired reinforcing material.

It is another object of this invention to provide a thermal insulation which is provided with a reinforcing material for supplying a suitable bonding surface for securing thereto desired types of surfacing materials.

The foregoing objects are accomplished in accordance with the instant invention by forming the thermal insulating material into strips, squares, hexagons or other suitable shapes and of a size consistent with the configuration and requirements of the particular application. A suitable tape or tapes of a desired reinforcing material are then woven through or around the thermal insulating material so that the tape or tapes pass alternately from one side of the thermal insulation being formed to the other side thereof so that the exposed surfaces of the tape or tapes provide good bonding surfaces to which may be secured a sheet or laminates of sheets of a desired surfacing material. The surfacing material may be of the same material as the tape or tapes or it may be of a suitable surfacing material which possesses particularly good bonding characteristics to the object to be insulated or the surfacing material may have the characteristics desired to meet the service conditions, i.e., resistance to extreme temperatures, high strength, ablative characteristics, high heat capacity and any other desired characteristic. If desired, a plurality of sheets of surfacing material may be laminated to the composite of the thermal insulation material and the tapes of reinforcing material to provide any desired surface characteristics. The choice of thermal insulating material, reinforcing tapes and surfacing materials and the method of construction depends on the type of conditions to be encountered. Insulating materials may be selected for temperature limit, thermal conductivity and other thermal physical properties. The reinforcing tapes, for like reasons, may be various combinations of metal or plastic reinforced fibrous material such as glass cloth, asbestos paper, resin impregnated glass cloth, resin impregnated asbestos paper or metal textile. A variety of surfacing materials or sheets of reinforcing material may be applied to meet requirements of extreme temperature resistance, imperviousness to liquids and vapors, strength, and good bonding characteristics to the object to be insulated.

The invention will be more fully understood and further objects and advantages thereof will become apparent when reference is made to the following detailed description of the preferred embodiments of the invention and the accompanying drawing in which:

FIG. 1 is a pictorial representation of one form of a reinforced thermal insulation made in accordance with the instant invention;

FIG. 2 is a pictorial representation of another form of a reinforced thermal insulation made in accordance with the instant invention;

FIG. 3 is a pictorial representation of another form of a reinforced thermal insulation made in accordance with the instant invention; and FIG. 4 is a pictorial representation of another form of a reinforced thermal insulation made in accordance with the instant invention.

In the form of the invention illustrated in FIG. 1, a plurality of strips or shapes 1 of a thermal insulating material are preformed by any suitable means into a generally rectangularly shaped geometrical solid configuration. Each strip 1 has upper and lower face portions 2, side portions 3 and end portions 4. The strips 1 are associated with a plurality of tapes 5 of a desired reinforcing material which tapes are woven through and around the strips 1 of the thermal insulating material. Adjacent tapes 5 pass around adjacent strips 1 alternately in opposite directions to form in effect a basket weave in which the strips 1 of thermal insulating material are in adjacent relationship with the longitudinal axes thereof extending generally parallel to each other. The tapes 5 extend generally in a transverse direction across each of the strips 1 and are woven about the strips 1 so that at any given position one of opposite portions of the two surfaces of each tape 5 is in contiguous relationship with some portion of one of the strips of the thermal insulating material. A sheet 6 of a desired surfacing material is then positioned over each of the broad surface areas defined by the strips 1 of the thermal insulating material woven in adjacent relationship by the tapes 5 so that the exposed surfaces of the tapes 5 and the strips 1 are in contiguous relationship with associated portions of each sheet 6 of surfacing material. The exposed surfaces of the tapes 5 thus present good bonding surfaces to be secured to the contiguous portions of the sheets 6 of surfacing material. Also, the thermal insulating material is securely held in position within the space defined by the associated portions of the tapes 5 and the surface sheet 6. The composite 7 thus formed is subjected to any necessary conditions such as heat and/or pressure to unite or fuse together the contiguous portions of the tapes 5 and the sheets 6 of surfacing material. Thus, there is formed a thermal insulation in which the thermal insulating material is intimately associated with the tapes of reinforcing material which provide good bonding surfaces to be attached to the sheets of surfacing material and in this manner to form a thermal insulation having the desired surface characteristics.

In the preferred embodiment of the instant invention, the thermal insulating material is of relatively low density and comprises one of two general types of particulate filler material. Both types of particulate material comprise, in the form used, agglomerates of ultimate effective structural units finer than 100 millimicrons. One type comprises agglomerates of finely divided solid particles of average ultimate effective dimension finer than 100 millimicrons, such as finer grades of channel type carbon blacks. The other general type of particulate filler material is a porous or fibrillate structure, and is exemplified by aerogels such as those of silica, chromic oxide, thoria, magnesium hydrate, alumina, and mixtures thereof. Such aerogels in particle form have a "straw stack" agglomerate fibril structure, with the fibrils composing the ultimate or finest structural unit of diameter finer than 100 millimicrons, and they can be treated to render them hydrophobic in nature. The average aerogel particles should embrace the total void or dead air space of 75 to 95% by volume. The amount of particulate filler component for the low density material preferably comprises from about 70 to 95% by weight of said low density material. However, proportions as low as 20% by weight of particulate filler can be utilized depending, of course, upon the properties desired from the ultimate product.

The binder component of the low density material should be present in an amount sufficient to impart rigidity and integrity to said low density material and to lend said material its handleable characteristics. Amount of binder as low as about 1% and as high as 35% by weight may be used in certain applications, however, amounts up to 15% by weight and preferably approximately 5% by weight are suitable for most all applications. Although organic binders are preferred over inorganic there are many suitable inorganic binders including low temperature fusing glasses or enamels, phosphates, alkali metal silicates, etc. The preferred binder comprises a thermosetting resin of phenolic of urea-formaldehyde type, although certain thermoplastic binders or heat- or catalyst-activated binders may be used such as vinyl chloride, vinyl chloride acetate copolymers, silicones, etc.

Staple reinforcing fibers, when included in the low density material component, may comprise such materials as various types of asbestos fibers of reinforcing grades, clean mineral fibers, organic fibers, fine diameter glass fibers, preferably pretreated, as with acid, to roughen the surface, or otherwise to improve the surface adhesion characteristics or mixtures thereof. The preferred inorganic fiber is a well opened, fine, staple amosite asbestos classifying as to length at least 25% longer than ¼ in. Suitable organic fibers may be natural fibers such as cotton, or synthetic fibers such as viscose or acetate rayon or acrylic fiber which may, in some instances, be heat treated. All of such fibers should preferably classify finer than 20 microns diameter, and further, finer than 100 microns. When utilized, the amount of fiber present in the bonded low density material may vary over a considerable range, depending upon the requirements of the particular insulation service. In most cases where fiber is utilized its content will comprise up to approximately 15% and most preferably approximately 5% by weight of the low density material.

Generally, and particularly where service temperatures above 150° F. are contemplated, the low density material should additionally include finely divided opacifiers of either organic or inorganic composition depending upon the insulating service temperatures. These opacifiers may be of the radiation reflective type, such as metallic aluminum or silicon powder; of the radiation absorbing type, such as finely divided carbon black or finely divided pigments, as for example, precipitated iron oxide or chromium oxide, or of the radiation scattering type, such as zircon, titanium dioxide, or other materials with a high index of refraction in the infra red. Various ones of these opacifiers, including carbon black of finer than 100 millimicrons particle size, may advantageously be used as an opacifier for aerogel fillers in amounts up to 40% by weight of the total low density material. It will be appreciated that the amount of opacifier required is usually determined by the severity of the radiation problem which increases with an increase in temperature.

Each tape 5 used in the preferred embodiment of the instant invention comprises a 181 glass cloth having a thickness of 0.0085 in.; a weight of 8.90 ounces per sq. yd.; is constructed with 57 x 54 ends and picks per inch; has a breaking strength in the warp of 340 and in the final fill of 330; and is of a satin weave. In the preferred embodiment, the 181 glass cloth is saturated with a phenolic resin of the type manufactured and marketed by the American Reinforced Plastics Company under the tradename "91-LD." The 181 glass cloth is impregnated so as to contain approximately 40% resin by weight and cured to a B-stage cure with approximately a 15% flow characteristic when subjected, in accordance with standard testing procedures, to a pressure of 15 lbs. per sq. in. at 325° F. Although identified as having a flow characteristic of approximately 15%, it is to be understood that such flow characteristic may vary in accordance with the properties desired and the impregnated glass cloth may have a flow characteristic between 3 to 30%.

In the preferred embodiment of the instant invention, the sheet 6 of surfacing material, which is to be used as the hot side and exposed to service conditions, is made from a high bulk asbestos paper comprising approximately 97% asbestos fibers and a 3% organic binder, which paper is saturated with a 52% solids solution of a phenol formaldehyde resin, to obtain a resin content of approximately 40–42%. A suitable phenolic resin is that manufactured and marketed by the American Reinforced Plastics Company under the trademark "91-LD." The resin saturated paper is partially cured (B-stage) and the solvent driven off by exposing the paper to a temperature of 180 to 200° F. for approximately 10 minutes and then to a temperature of approximately 260° F. for approximately 10 minutes. The sheet 6 of surfacing material used has a thickness of 0.0625 in. Many other types of material may be used for the sheet of surfacing material. The type of material and thickness used depends upon the service conditions to be encountered, i.e., resistance to extreme service conditions, high strength, ablative characteristics, high heat capacity and other desired characteristics. In addition to the resin reinforced asbestos paper described above, there may be used materials such as resin reinforced glass papers, resin reinforced glass or mineral fiber felts, reinforced asbestos felts having ablative characteristics, leached glass cloths and other similar materials.

The sheet 6 of surfacing material which is to be used on the cold side of the thermal insulation in the preferred form of the instant invention comprises a sheet of resin impregnated asbestos paper, as described above, having in this example a thickness of approximately 0.030 in. The thickness of the sheet of surfacing material depends upon the conditions to be encountered. Although a resin impregnated asbestos paper is described as the surfacing material in the preferred embodiment, it is readily apparent that such sheet of surfacing material may be formed of any desired material as for example any form of steel, aluminum or other metals in suitable thicknesses and secured by appropriate means to the thermal insulation.

As described above, the tapes 5 comprise a 181 glass cloth. However, if desired, the tapes 5 can comprise a metal foil in suitable thicknesses or a metal textile having a weave of any desired characteristic, i.e., a suitable tape can be cut from a metal textile comprising a 50 mesh screen woven from 0.009 in. diameter wire and wherein each opening between adjacent wires is approximately 0.011 in. The use of a metal textile to form the tape 5 is especially desirable where conditions require the use of steel in some form in the sheet of surfacing material for the cold side. The metal textile may then be comprised of a suitable material so that it can be welded to the sheet of steel surfacing material. The sheet of surfacing material for the hot side can be comprised of resin saturated asbestos paper, as described above, wherein the resin from the saturated asbestos paper will flow through and around the metal textile when exposed to the proper conditions so that when cured the metal textile will be securely bonded to adjaent sections of the sheet of surfacing material.

Whenever a steel surfacing material is used with tapes comprised of a resin impregnated 181 glass cloth, as described above, it is sometimes desirable to supplement the bond between the glass cloth and the sheet of surfacing material by a mechanical means. For example, the mechanical means can comprise projections from the sheet of surfacing material having enlarged heads and adapted to pierce the associated portions of the glass tape. When subjected to the proper conditions, the resins in the impregnated cloth will flow around the projections and when cured will materially assist in holding together the sheet of surfacing material and the glass cloth. Another type of supplement for the bond may comprise an intermediate sheet of a complementary material possessing good characteristics for securing thereto the glass cloth and the sheet of surfacing material.

In accordance with the disclosure relative to FIG. 1, a piece of a preformed insulating material of the type described above which is marketed by Johns-Manville Corporation under the trademark "1301 MIN-K," at a density of 20 lbs. per cu. ft., 4 in. x 4 in. x ¼ in., was cut into four strips or shapes, each strip or shape being 4 in. long and 1 in. wide. A piece of resin impregnated 181 glass cloth impregnated with a phenolic resin of the type manufactured and marketed by the American Plastics Corporation under the trademark "91–LD" was cut into four tapes, 1 in. wide. These four tapes were woven through the four strips of thermal insulating material in accordance with the disclosure in FIG. 1 and trimmed to provide the desired construction. A sheet, 4 in. x 4 in. of a B-stage resin impregnated asbestos paper, of the type described above, having a thickness of 0.0625 in. was placed on the bottom surface and another on the top surface of the composite formed by the strips of thermal insulating material woven together by the tapes. The composite, including the sheets of surfacing material, was placed in a mold and the mold was closed so that the four strips of thermal insulating material were pressed tightly together. The mold was held under 200 p.s.i. pressure and 300° F. in a heated press for one-half hour to fuse together the resinous materials and provide a good bond to the asbestos paper sheets to thus form one unitary and consolidated thermal insulation having the desired surface characteristics.

In FIG. 2, there is illustrated another method for forming a thermal insulation in accordance with the instant invention from a plurality of strips 10 of a thermal insulating material, each strip 10 having upper and lower faces 11, sides 12 and ends 13 and being preformed by any suitable means into a generally rectangularly shaped solid configuration. A tape 14 of a reinforcing material is woven about the blocks 10 of thermal insulating material so that one surface of the tape 14 alternately is in contiguous relationship with an upper or lower face of an adjacent block 10 of the thermal insulating material and with at least one of the adjacent sides 12 of the adjacent blocks. A sheet 15 of a desired type of surfacing material is then superposed over each of the broad surface areas defined by the exposed surfaces of the strips 10 of thermal insulating material and the tapes 14 so that the exposed surfaces of the tapes 14 and the strips 10 are in contigous relationship with the associated portions of each sheet 15 of surfacing material. The exposed surfaces of the tapes 14 provide good bonding surfaces for joining the tapes 14 to the sheet 15 of surfacing material. The composite 16 thus formed, including the sheets 15 of surfacing material, is subjected to necessary conditions such as heat and/or pressure to unite and fuse together the exposed portions of the tapes 14 to the contiguous portions of the sheets 15 of surfacing material.

Although as illustrated in FIGS. 1 and 2, the thermal insulation formed is generally rectangular in nature, it is to be understood that the thermal insulating material may be in any desired shape as, for example, triangular with the apex portion of each adjacent triangular section facing in substantially opposite directions. Also, by varying the initial transverse cross-sectional configuration of the strips of thermal insulation, any desired final configuration or shape may be obtained. Thus, if desired, the strips 10 could be generally trapezoidal in transverse cross-section so that when united with all of the shorter bases facing in the same direction and the sides thereof in contiguous relationship, a generally arcuate configuration would be formed. In like manner, other shapes and configurations may easily be fabricated.

In FIG. 3, there is illustrated another method for forming the thermal insulation in accordance with the instant invention. A block or shape 20 of a thermal insulating material having upper and lower faces 21, sides 22 and ends 23 is provided at periodic locations with a plurality of slots 24 which extend through the block 20 of thermal insulating material from the upper face thereof to the lower face thereof. A plurality of tapes 25 of a reinforcing material having a thickness and width substantially equal respectively to the thickness and width of slots 24 are passed or laced through the slots 24 with sufficient tension so that the surface portions of the tapes 25 adjacent the thermal insulating material 20 are in contiguous relationship with the portions of the upper and lower faces 21 over which they pass and the walls of the slots 24. A sheet 26 of a desired type of surfacing material is superposed over each of the upper end lower faces 21 of the thermal insulating material so that the exposed portions of the tape 25 and the block 20 are in contiguous relationship therewith. The exposed surfaces of the tapes 25 provide good bonding surfaces for joining the tapes 25 to the sheets 26 of surfacing material or to an intermediate sheet of complementary material as described above to thus secure the thermal insulating material to the sheets of surfacing material. The composite 27 thus formed, including the sheets of surfacing material, is subjected to the necessary conditions such as heat and/or pressure to unite and fuse together the exposed portions of the tapes 25 to the contiguous portions of the sheets 26 of surfacing material or complementary material.

In FIG. 4, there is illustrated another method of forming a thermal insulation in accordance with the instant invention in which the thermal insulation is preformed into a plurality of blocks or shapes 30 having upper and lower faces 31 which are substantially square in configuration, sides 32 and ends 33. A first set of a plurality of tapes 34 are woven alternately through the plurality of blocks 30 so that each tape 34 is alternately in contiguous relationship with an upper or lower face 31 of adjacent blocks 30 and with adjacent sides 32. A second set of a plurality of tapes 35 are woven alternately through the plurality of blocks 30 so that each tape 35 is alternately in contiguous relationship with an upper or lower face 31 of an adjacent block 30 and with adjacent ends 33. The tapes 34 and 35 are woven through the blocks 30 so that the tapes extend in directions which are substantially perpendicular to each other. Also, the tapes 34 and 35 are woven through the blocks 30 so that when a tape 34 is in contiguous relationship with an upper face 31 of one block 30, a tape 35 is in contiguous relationship with the lower face 31 of the same block 30. Thus, all portions of the faces 31, sides 32, and ends 33 of each of the plurality of blocks 30 are in contiguous relationship with a portion of a tape 34 or 35 of reinforcing material. A sheet 36 of a desired type of surfacing material is then superposed over each of the exposed surfaces of the tapes 34 and 35 to be in contiguous relationship therewith. The exposed surfaces of the tapes 34 and 35 provide a good bonding surface for uniting the tapes 34 and 35 to the sheets 36 of surfacing material. The composite 37 thus formed is subjected to the necessary conditions such as heat and/or pressure to unite and fuse together the exposed portions of the tapes 34 and 35 and the sheets 36 of surfacing material. The thermal insulation formed in accordance with the disclosure relative to FIG. 4 is structurally very sound and strong and is used in conditions requiring exceptional strength. Even though a plurality of tapes are used as illustrated in FIG. 4, the change in thermal conductivity of the thermal insulation produced in accordance with FIG. 4 is less than 10% from the thermal insulating qualities of a corresponding block of the thermal insulating material. In the forms of the invention illustrated in FIGS. 1–3, inclusive, the change of thermal conductivity is even less than that explained in relation to the form illustrated in FIG. 4. Although as explained in connection with FIG. 4, the faces 31 of the blocks 30 have a generally square configuration, these faces could have any desired configuration such as for example, hexagonal, and the reinforcing tapes could extend therethrough generally diagonally of the composite thermal insulation.

In the preferred embodiments of the invention as described above, the reinforcing tapes generally comprise a resin impregnated 181 glass cloth. However, it is to be understood that non-impregnated tapes of the desired reinforcing material, such as a non-impregnated 181 glass cloth, could be woven through the blocks of thermal insulation material as described in any of the above methods so that the exposed portions of the tape provide the desired bonding surfaces. The sheets of surfacing material, such as the resin impregnated asbestos papers, as described above, in thicknesses of over .125 in., are superposed over the bonding surfaces of the composite thus formed to be in contiguous relationship with the exposed surfaces of the reinforcing tapes. When suitable heat and pressure are applied, the resinous material in the sheets of surfacing material flows into the exposed or bonding surfaces of the reinforcing tapes to fuse the tapes at those portions to the sheets of surfacing material. Thus, there is formed a thermal insulation in which the reinforcing tapes are woven intimately through the thermal insulating material which is securely retained in position by the high strength bond between the tapes and the associated sheet of a relatively thick surfacing material to produce a thermal insulation having the desired surface characteristics. It is again to be noted that the change in conductivity of the thermal insulating material when reinforced in accordance with the methods of the instant invention is less than 10%. After being formed, the thermal insulation may be cut into any desired surface configuration.

Although described above in relation to a thermal insulating material of the type marketed by Johns-Manville Corporation under the trademark "MIN-K," it is to be understood that other types of thermal insulating materials could be suitably reinforced with any of the methods described above. The instant invention is specifically directed to those thermal insulating materials which are generally molded and which in physical characteristics are substantially rigid and yet are readily delaminable and possess little, if any, resistance to mechanical shock, and/or erosion. The term, rigid, as used in the instant application relates to that type of insulation which possesses characteristics of rigidity as exemplified by "1301 MIN-K" insulation, described above, at a density of at least 10 lbs. per cu. ft. and preferably having a density in range of 15 to 22 lbs. per cu. ft. In addition to those materials described above, and within the term, rigid, the instant invention is to include any substantially, relatively non-resilient material such as: thermal insulations containing 85% magnesia and 15% asbestos; thermal insulations wherein specially selected and calcined diatomaceous silica is blended with other insulating materials and bonded with asbestos fibers; thermal insulations composed of hydrous calcium silicate combined with asbestos fibers; and other thermal insulating materials possessing characteristics of this nature. Thermal insulations as described above are marketed as articles of commerce by Johns-Manville Corporation under the following trademarks: "Fibrocel," a molded silicate insulation formed by a special process and composed of hydrous calcium silicate combined with asbestos fiber; "Superex," a molded insulation manufactured by blending specially selected and calcined silica with other insulating materials and bonded with asbestos fiber; and 85% magnesia, a molded insulation principally comprising 85% magnesia and 15% asbestos and also foamed polystyrene as marketed as an article of commerce by Dow Chemical under the trademark, "Styrofoam."

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. A product to be made into a reinforced thermal insulation comprising a unitary shape of thermal insulating material having face portions, side portions and end portions facing in opposite directions, said shape comprising rigid, readily delaminable thermal insulating material, said shape having a plurality of slots formed therein, said slots passing through said shape from one face portion thereof to the other face portion thereof, each of said slots forming an enclosed passageway through said shape, each of said slots forming an opening in each face portion having a width greater than its thickness and extending relative to each other in parallel spaced relationship, said slots forming at least one row of slots aligned in a direction perpendicular to the width of said slots, at least one tape of a reinforcing material being threaded through said plurality of slots so as to provide each of said face portions with a plurality of spaced bonding areas, a sheet of surfacing material superposed over each of said face portions so that said sheets of surfacing material are in contiguous relationship with said tape at said bonding areas, and means in each of said sheets of surfacing material and said tape at said bonding areas so that said sheets of surfacing material may be secured to said tape at said bonding areas with said shape of rigid, readily delaminable thermal insulating material retained securely in position relative to said sheets of surfacing material.

2. A product to be made into a reinforced thermal insulation comprising a unitary shape of thermal insulating material, said shape having face portions, side portions and end portions facing in opposite directions, said shape comprising rigid, readily delaminable thermal insulating material, said shape having a plurality of slots formed therein, said slots passing through said shape from one face portion thereof to the other face portion thereof, each of said slots forming an enclosed passageway through said shape, each of said slots forming an opening in each face portion having a width greater than its thickness and extending relative to each other in parallel spaced relationship, said slots forming a plurality of rows of slots, each of said rows comprising a plurality of slots aligned in a direction perpendicular to the width of said slots, a plurality of tapes each comprising a reinforcing material, each of said tapes being threaded through one of said rows of slots so as to provide each of said face portions with a plurality of spaced bonding areas, a sheet of surfacing material superposed over each of said face portions so that said surfacing material is in contiguous relationship with said tapes at said bonding areas, and means in each of said sheets of surfacing material and said tapes at said bonding areas so that said sheets of surfacing material may be secured to said tapes at said bonding area with said shape of rigid, readily delaminable thermal insulating material retained securely in position relative to said sheets of surfacing material.

3. A product as defined in claim 2 wherein each of said sheets of surfacing material and said tapes at said bonding areas are impregnated with a resinous material so that said sheets of surfacing material and said tapes at said bonding areas will be bonded to each other when suitable heat and pressure are applied thereto.

4. A product as defined in claim 2 wherein each of said tapes comprise a metal textile and at least one of said sheets of surfacing material comprises a metallic material so that said sheet of surfacing material may be secured to said tapes by welding.

5. A product as defined in claim 4 wherein the other of said sheets of surfacing material is impregnated with resinous material so that a portion of said resinous material will flow from said sheet of surfacing material into and become bonded with said metal textile of said tapes upon the application of suitable heat and pressure.

References Cited in the file of this patent

UNITED STATES PATENTS

| | | |
|---|---|---|
| 310,205 | Johns | Jan. 6, 1885 |
| 2,197,132 | Lougheed | Apr. 16, 1940 |
| 2,426,058 | Scogland | Aug. 19, 1947 |
| 2,737,227 | Brummel | Mar. 6, 1956 |
| 2,777,789 | Smith | Jan. 15, 1957 |
| 2,788,053 | Dolbey et al. | Apr. 9, 1957 |